United States Patent
Hui et al.

(10) Patent No.: US 9,537,593 B2
(45) Date of Patent: Jan. 3, 2017

(54) DYNAMICALLY ADJUSTING ROUTE OR LINK TOPOLOGY TO MINIMIZE SELF-INTERFERENCE

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 14/284,569

(22) Filed: May 22, 2014

(65) Prior Publication Data

US 2015/0341140 A1    Nov. 26, 2015

(51) Int. Cl.

| | |
|---|---|
| *H04J 3/10* | (2006.01) |
| *H04B 3/32* | (2006.01) |
| *H04B 3/54* | (2006.01) |
| *H04B 15/00* | (2006.01) |
| *H04L 1/00* | (2006.01) |
| *H04L 12/707* | (2013.01) |
| *H04L 12/64* | (2006.01) |

(52) U.S. Cl.
CPC . *H04J 3/10* (2013.01); *H04B 3/32* (2013.01); *H04B 3/54* (2013.01); *H04B 15/00* (2013.01); *H04L 1/00* (2013.01); *H04L 1/0015* (2013.01); *H04L 12/6418* (2013.01); *H04L 45/22* (2013.01)

(58) Field of Classification Search
CPC ............... H04B 3/32; H04B 3/34; H04B 3/33; H04B 3/542; H04L 12/6418; H04J 3/10
See application file for complete search history.

(56) References Cited

U.S. PATENT DOCUMENTS

| | | |
|---|---|---|
| 8,515,382 B2 | 8/2013 | Schwager et al. |
| 2012/0161543 A1 | 6/2012 | Reuven et al. |
| 2012/0182881 A1 | 7/2012 | Ananthakrishnan et al. |
| 2012/0320768 A1* | 12/2012 | Shaffer ................. H04W 40/16 370/252 |
| 2013/0051446 A1 | 2/2013 | Vijayasankar et al. |
| 2014/0016468 A1* | 1/2014 | Daraiseh ............... H04L 45/121 370/235 |
| 2014/0169200 A1* | 6/2014 | Woo ..................... H04J 11/0056 370/252 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Omer S Mian
(74) *Attorney, Agent, or Firm* — Parker Ibrahim & Berg LLC; James M. Behmke; Stephen D. LeBarron (57) ABSTRACT

In one embodiment, a method is disclosed in which physical layer information is received from one or more nodes along a path in a network. Self-interference information is also received from the one or more network nodes. The presence of self-interference along the path is identified and a transmission strategy of the one or more nodes is altered based on the identified self-interference and the received physical layer information.

17 Claims, 10 Drawing Sheets

DYNAMICALLY ADJUSTING ROUTE OR LINK TOPOLOGY TO MINIMIZE SELF-INTERFERENCE

TECHNICAL FIELD

The present disclosure relates generally to computer networks, and, more particularly, to mechanisms for adjusting communication links in a mesh network based on the presence of self-interference.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

In some cases, an LLN device may communicate using multiple link technologies, such as radio frequency (RF), power line communication (PLC), and/or cellular. Link technologies common to LLN deployments also typically communicate on shared media. For example, LLN devices may communicate on different electrical phases of a tri-phase electrical system using PLC transceivers. For these reasons, different pairs of devices communicating within close physical proximity may interfere with each other, resulting in a type of interference called self-interference. Unlike interference due to external sources (e.g., environmental conditions, etc.), self-interference is a form of localized interference that can be attributed to the network itself. Particularly in the context of LLNs, it is challenging and difficult to devise network solutions that account for the effects of self-interference between devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method is disclosed in which physical layer information is received from one or more nodes along a path in a network. Self-interference information is also received from the one or more network nodes. The presence of self-interference along the path is identified and a transmission strategy of the one or more nodes is altered based on the identified self-interference and the received physical layer information.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
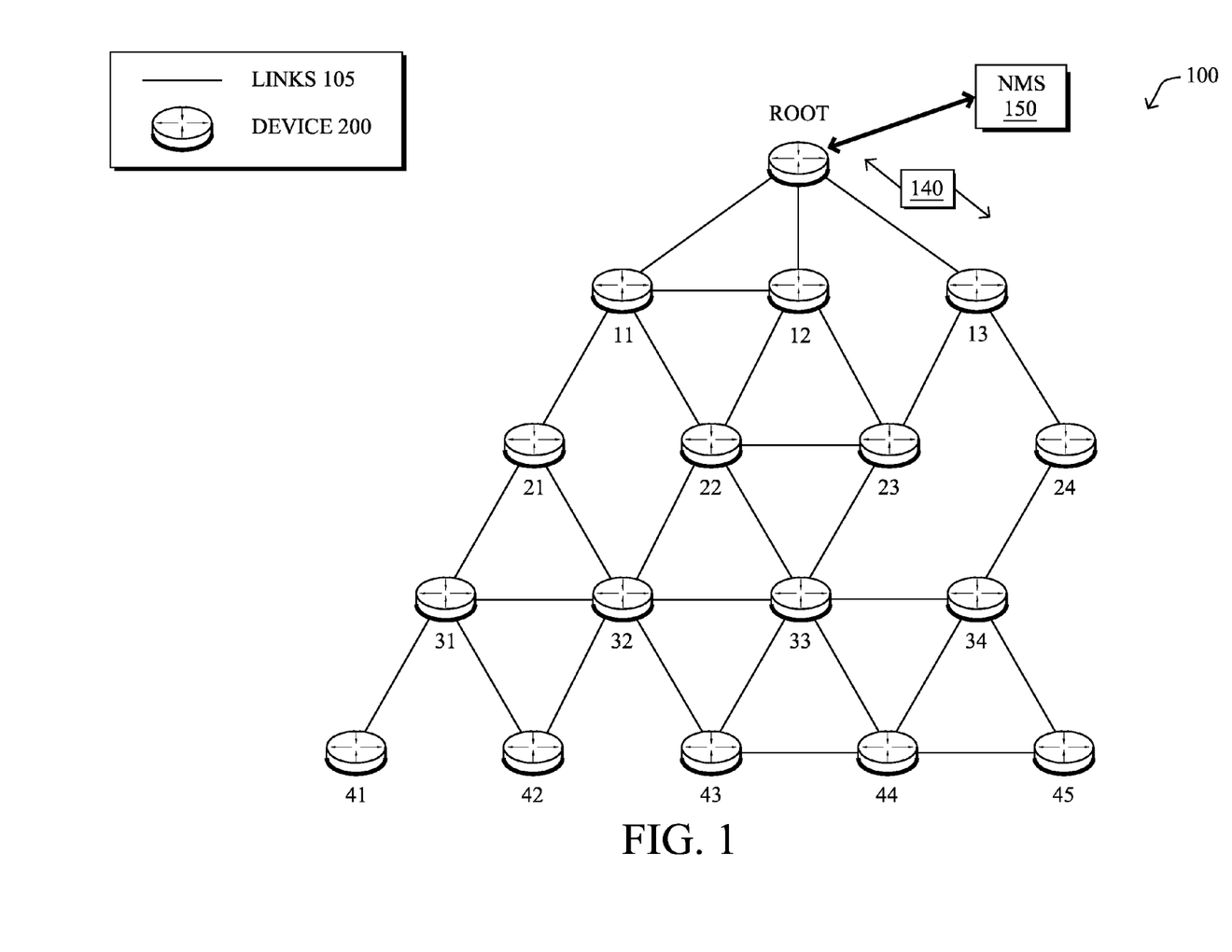
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, Wi-Fi, Bluetooth®, etc.), PLC protocols, or other shared-media protocols where appropriate. In this context, a protocol consists of a set of rules defining how the nodes interact with each other.

Figure 2:
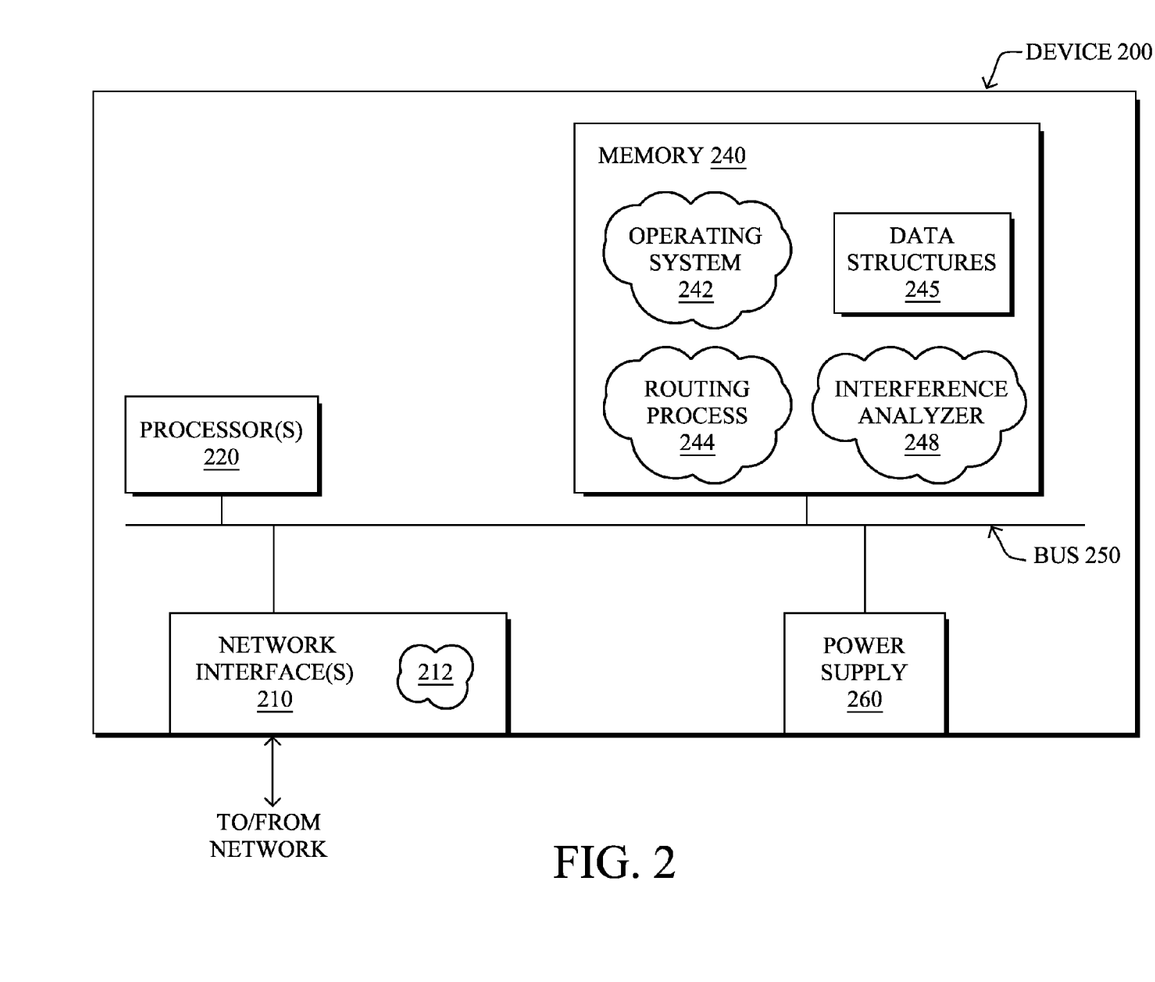
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. In other words, device 200 may communicate with another network device using two or more different communication technologies/physical layers (e.g., wireless, PLC-based, etc.). Also, while the network interface 210 is shown separately from power supply 260, for PLC the network interface 210 may communicate through the power supply 260, or may be an integral component of the power supply. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an interference analyzer 248, as described herein. Note that while processes 244, 248 are shown in centralized memory 240, alternative embodiments provide for the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Interference analyzer process 248 generally includes the instructions executed by the processor 220 to detect, analyze, and/or report the existence of self-interference, as described in greater detail below. Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed. In various embodiments, routing process 244 may issue instructions to other devises/nodes that cause the other nodes to alter their communication strategies (e.g., which physical layers are used, etc.) based on self-interference detected by interference analyzer process 248).

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Another distinguishing characteristic of LLNs and other forms of shared media networks is the increased possibility of self-interference conditions within the network. In general, self-interference occurs when communications between different pairs of network nodes/devices within close physical proximity interfere with one another.

Figure 3:
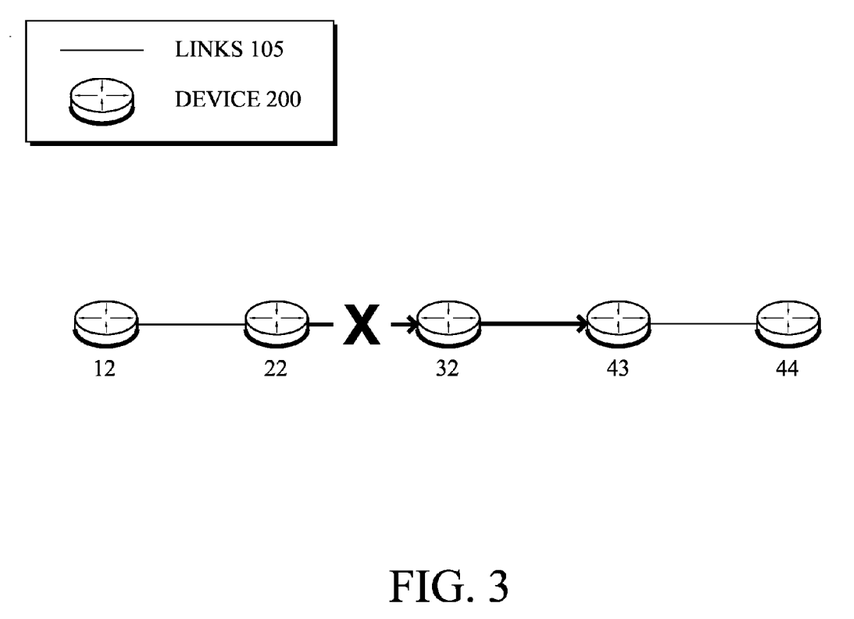
FIG. 3 illustrates an example of self-interference along a communication path.

One example of a self-interference condition is illustrated in FIG. 3. As shown, assume that nodes/devices 12, 22, 32, 43 and 44 communicate wirelessly using a half-duplex setup. In such a setup, a device can only receive or transmit at any given time, regardless of which wireless channels are used. For example, assume that wireless communications to and from node 32 are half-duplexed and that node 32 is currently transmitting data to node 43. In such a case, data cannot be received by node 32 from node 22 at the same time, thereby causing a self-interference condition.

Figure 4:
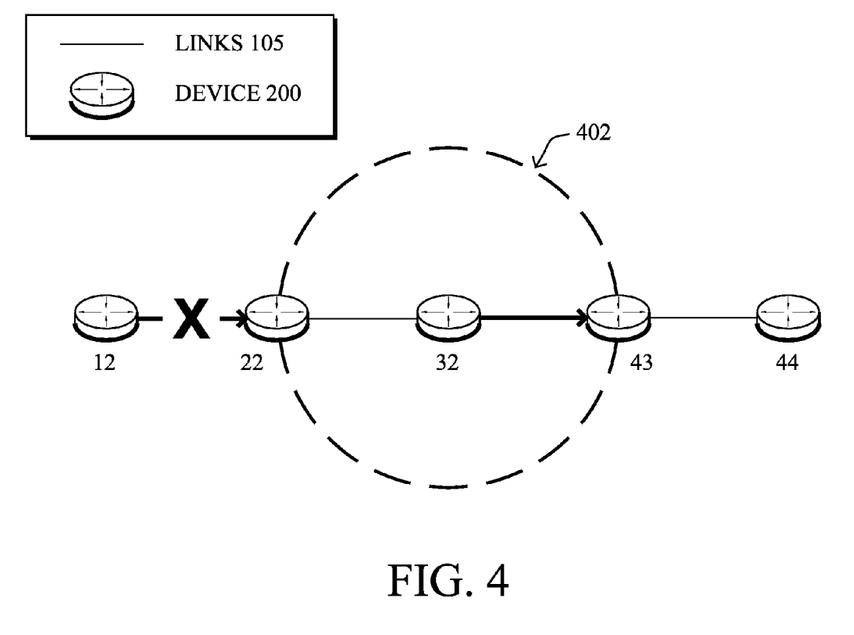
FIG. 4 illustrates another example of self-interference along a communication path.

FIG. 4 illustrates another example of a self-interference condition along a communication path. As shown, assume that each of nodes 12, 22, 32, 43, 44, and 45 independently determine their own channel hopping schedules. Such a schedule may indicate the channel on which a node may receive data at a particular point in time. To facilitate communications between the nodes, each node may share its channel hopping schedule with its neighboring devices. Thus, node 12 may not have knowledge of the channel usage of nodes 32, 43 and vice versa. Now, assume that node 32 is communicating data to node 43 using a particular channel and that node 32 has a transmission range 402. In such a case, a self-interference condition may be present if node 12 attempts to communicate with node 22 using the same channel, since node 22 is also within transmission range 402 of node 32.

Figure 5:
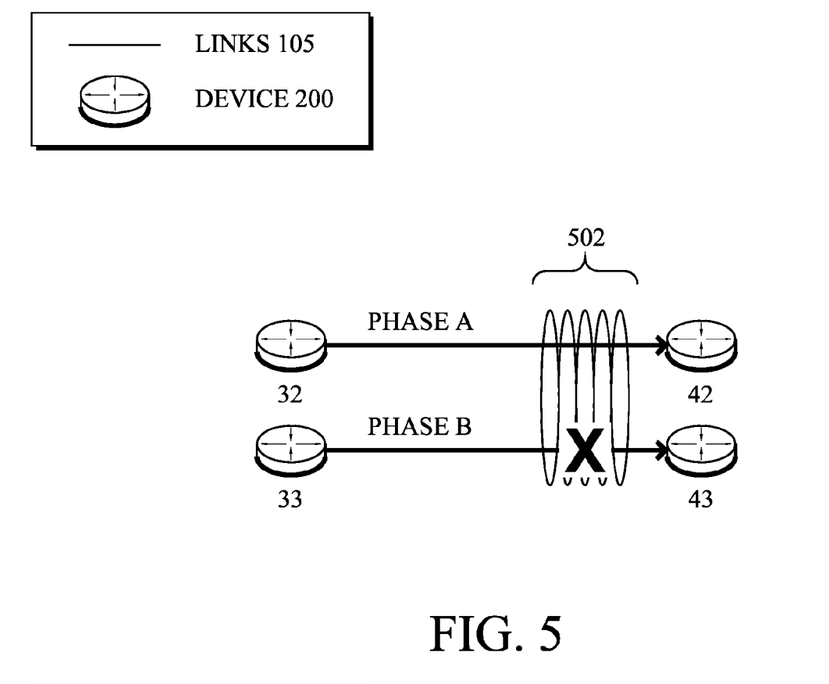
FIG. 5 illustrates an example of self-interference due to crosstalk between adjacent PLC links.

Self-interference conditions may also be present in other forms of shared media, such as PLC links. For example, as shown in FIG. 5, nodes 32, 33, 42, and 43 may communicate on a given electrical phase present in the power line system. In particular, node 32 may communicate with node 42 on first electrical phase (phase A) and node 33 may communicate with node 43 on a second electrical phase (phase B) on adjacent communication links. In some cases, crosstalk 502 may present, meaning that the data transmitted on phase A makes its way onto phase B or vice-versa. The degree of crosstalk between electrical phases may vary in both the time and space domains. Thus, a self-interference condition due to crosstalk 502 may exist if node 33 attempts to transmit data to node 43 when node 32 is transmitting data to node 42.

Figure 6:
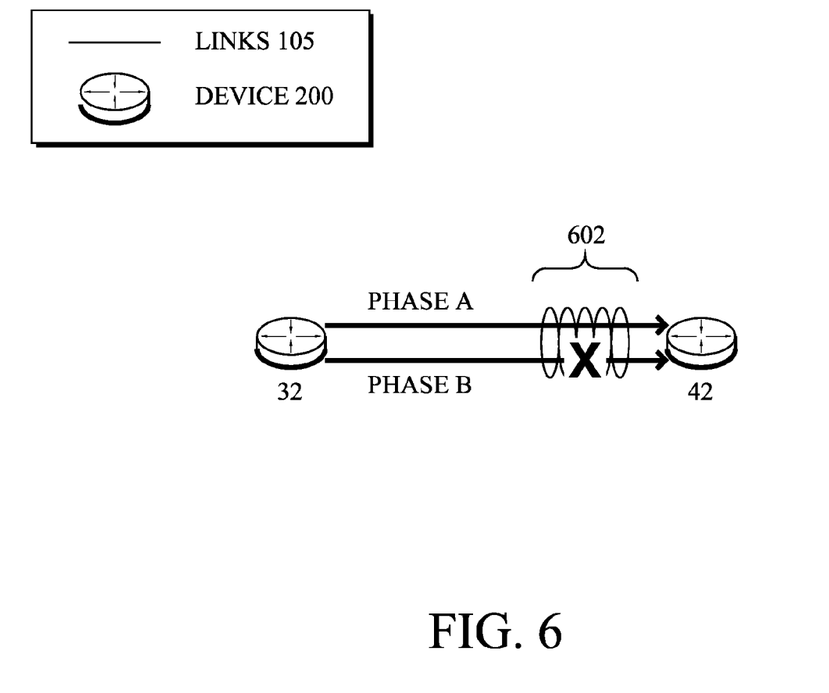
FIG. 6 illustrates an example of self-interference due to crosstalk between different electrical phases.

In some cases, a given PLC device may use different electrical phases to transmit data to a neighboring device simultaneously. As shown in the example of FIG. 6, assume that nodes 32, 42 are both connected to electrical phases A and B. Thus, node 32 may use both phases A and B, to communicate data to node 42. However, a self-interference condition may result if node 32 attempts to use both phases at the same time and crosstalk 602 exists between the two phases.

As noted above, self-interference conditions present unique challenges in shared media networks, such as LLNs. In particular, the presence of self-interference is often unpredictable in such networks and may vary with time.

Dynamically Adjusting Route/Link Topologies to Minimize Self-Interference

The techniques herein provide for the dynamic adjustment of network links and/or routes in a mesh network to minimize self-interference. In some aspects, network nodes/devices may provide information about link properties to a central device (e.g., a DODAG Root, NMS, etc.). For example, a network node may report information such as its channel-mask, channel-hopping schedule, physical layers available for communication, or other such information. Network nodes may also monitor and report on network events or conditions that potentially indicate the presence of self-interference. For example, a network node may monitor packet reception failures, count failures that are likely due to collisions and self-interference, and provide that information to a central device (e.g., a DODAG Root, NMS, etc.). Based on the received physical layer and self-interference information, the central device may identify areas of the network that are experiencing undesirable levels of self-interference and compute different link properties and/or routing strategies to minimize self-interference. The central device may then send a control message to instruct one or more devices to adjust their link properties and/or route selection, to reduce or eliminate the self-interference.

Specifically, according to one or more embodiments of the disclosure as described in detail below, physical layer information may be received by a network device from one or more nodes along a path in a network. Self-interference information is also received from the one or more network nodes. The presence of self-interference along the path is identified and a transmission strategy of the one or more nodes is altered based on the identified self-interference and the received physical layer information.

Illustratively, the techniques described herein may be performed by hardware, software, and/or firmware, such as in accordance with the processes 244, 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, the techniques herein allow for a central network device to facilitate changes to the routing topology and/or data links used to convey traffic through the network. The centralized device may be a supervisory device such as a DODAG root, NMS, PCE, etc., or may be another network node that has been selected to perform adjustments to at least a portion of the network.

Figure 7:
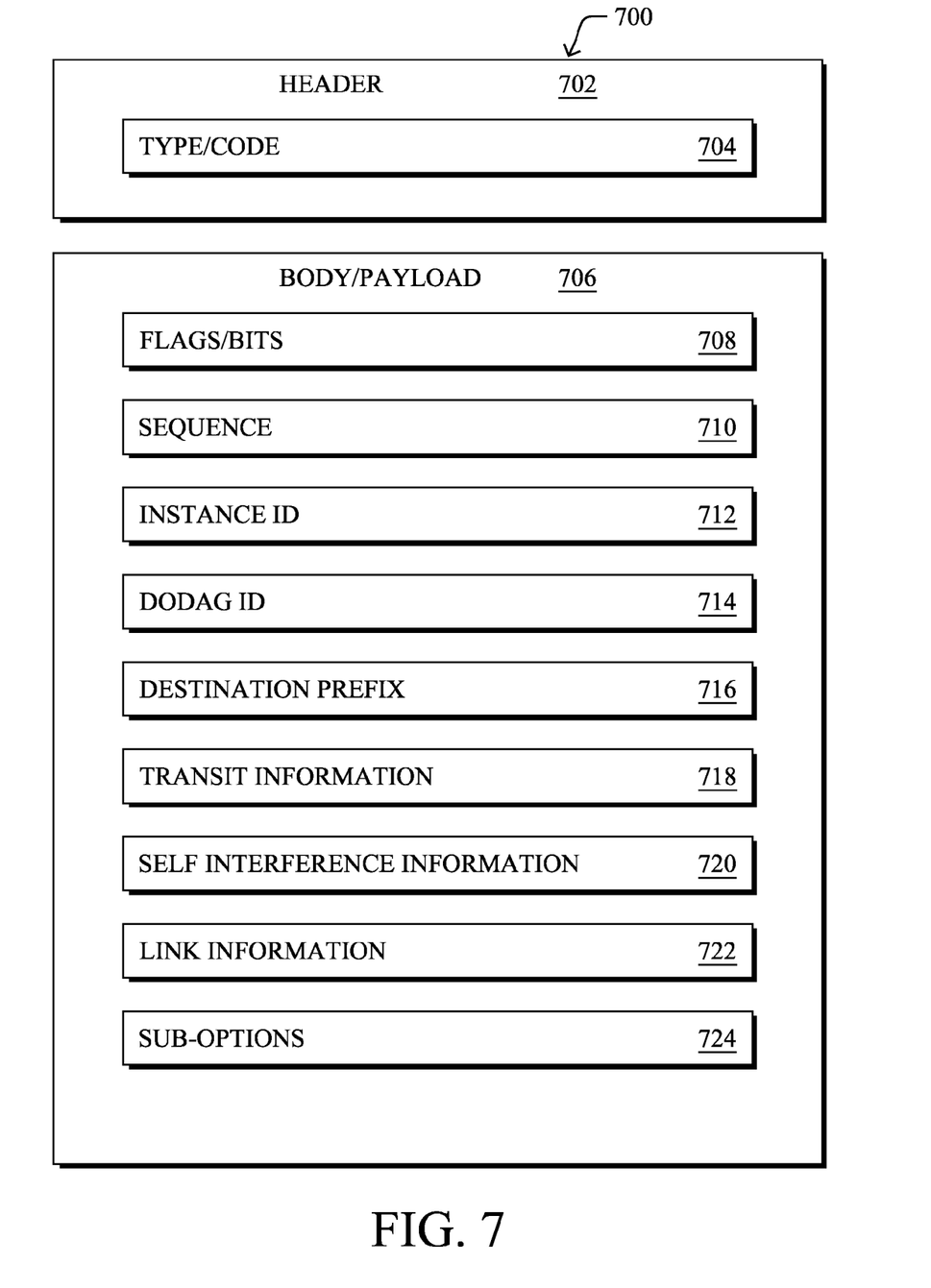
FIG. 7 illustrates an example message.

FIG. 7 illustrates an example format for a message 700 that may be used for discovery and route dissemination when building a DAG, e.g., as a DAO message. Message 700 illustratively comprises a header 702 with one or more fields 704 that identify the type of message (e.g., a RPL control message), and a specific code indicating the specific type of message (e.g., as a DAO message). Within the body/payload 706 of the message may be a plurality of fields used to relay the pertinent information. In particular, the fields may comprise various flags/bits 708, a sequence number 710, an instance ID 712, a DODAG ID 714, destination prefixes 716, and/or a transit information field 718, among others (e.g., DAO_Sequence used for ACKs, etc.). One or more additional sub-option fields 724 may also be used to supply additional or custom information within message 700.

In various embodiments, message 700 may include self-interference information 720 that includes information regarding self-interference associated with a given communication path. In one embodiment, self-interference information 720 may simply indicate whether a communication link between a node and its DODAG parent exhibits self-interference (e.g., a node/device may indicate whether the device has detected self-interference). For example, in the case of crosstalk, a device may be configured to determine that crosstalk exists between electrical phases and include an indication of such in interference information 720. In another embodiment, interference information 720 may be further augmented with the link or set of links that exhibit crosstalk effects (e.g., a node/device may identify both the presence of self-interference as well as determining where the interference is occurring). In further embodiments, interference information 720 may include information that may be used by a central network device (e.g., root, NMS, etc.) to detect the presence of self-interference. As would be appreciated, crosstalk introduces dependencies between different physical communication media. Thus, message 700 may be sent to a traffic shaping device, such as a path computation engine (PCE), DODAG Root, or other network node, and used to determine self-interference along a communication path in the network.

In further embodiments, message 700 may include link information 722 regarding which links/physical layers a particular device is using or is capable of using. For example, link information 722 may indicate whether the device is able to use one or more PLC links or a wireless connection with another device. Link information 722 may further include information regarding the links, such as the hopping schedule of a wireless link, signal strength information, dropped packet information, etc. In some cases, a device may not be able to identify self-interference on its own. In such cases, a central network device (e.g., traffic shaper, PCE, etc.) may use the link information 722 from different devices along a path to identify the presence of self-interference. In other words, link information 722 may itself be used as self-interference information in some cases, since link information 722 may be used to detect the presence of self-interference. In further embodiments, the central device may use link information 722 to identify points along the path that may exhibit self-interference, regardless of whether self-interference has actually occurred (e.g., devices in close proximity using the same communication media).

Figure 8A:
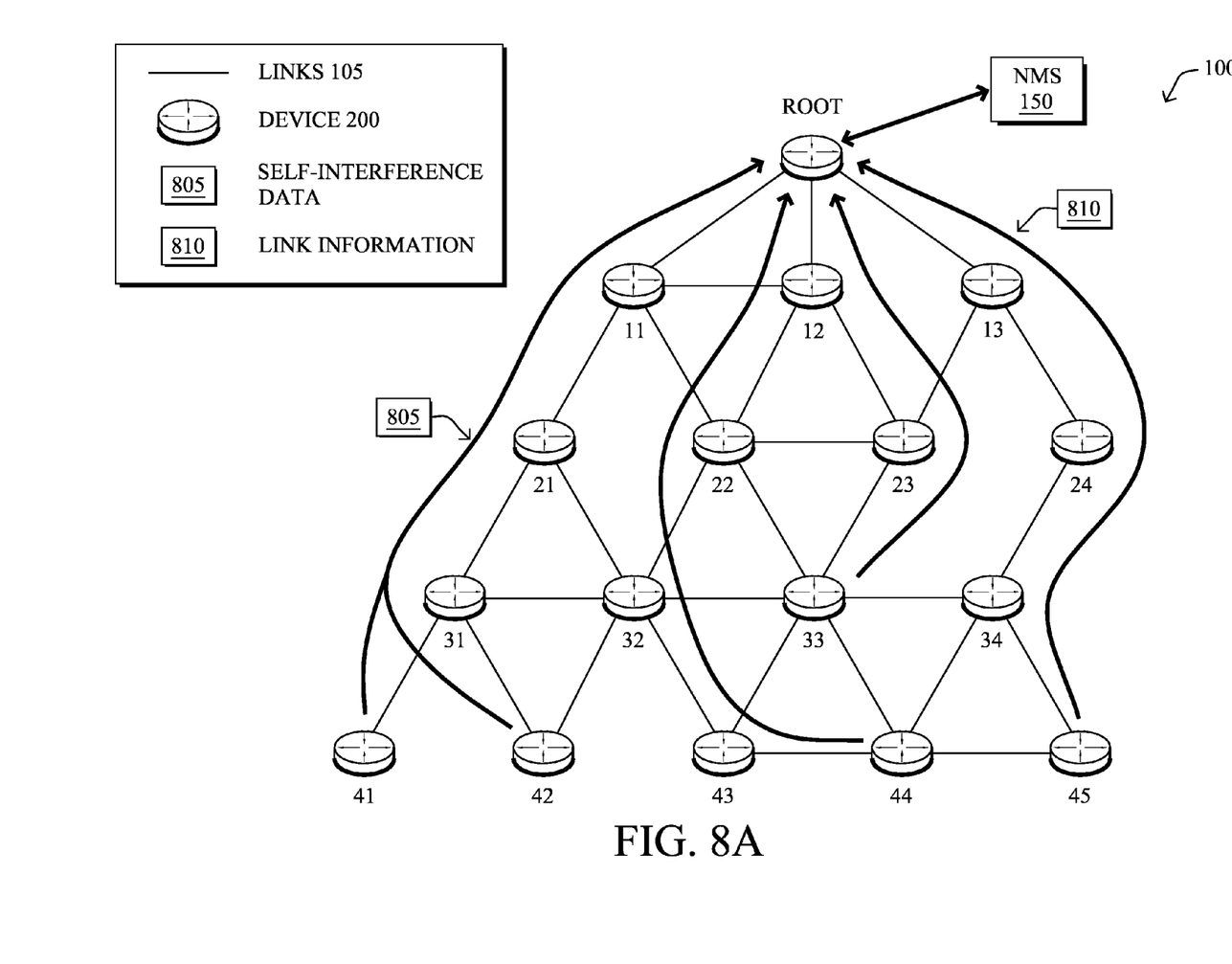
FIGS. 8A-8B illustrate an example of a network root altering the transmission strategy of a node.

Referring now to FIG. 8A, an example is shown of the network nodes/devices of network 100 reporting information to a central device, such as the root device. Such information may be included in a DAO message (e.g., in accordance with message 700), included in a message from another protocol (e.g., a network monitoring protocol), or sent via standalone messages. According to various embodiments, the central device may collect link information 810 from the network nodes, such as physical link topology information. In general, the link information indicates which physical layers/media are available to, or in use by, a node to communicate with a neighboring node. As highlighted above, a network node may be configured to utilize different communication media to communication with a neighbor node (e.g., via a wireless link, via a PLC link, etc.). In some embodiments, the reported link information may also include details regarding a physical layer that is in use by the node. For example, a node may report on its wireless parameters such its channel-hopping schedule, channel-mask that defines the set of channels being used, the transmission power, or other such information. In another example, the node may report on PLC link information such as which electrical phase(s) are connected to the device or are currently used by the device for communications. The report may also include historical information such that the PCE or other device may compute routes based on time.

In various embodiments, one or more network nodes may also report self-interference information to the central device (e.g., the PCE, DODAG root, NMS, or other designated node). For example, the nodes shown in FIG. 8A may provide self-interference data 805 to the root device for further analysis. Similar to link information 810, self-interference data 805 may be included in a DAO message (e.g., in accordance with message 700), as a stand-alone message, or included in a message using another protocol. In various embodiments, a particular node may monitor link conditions, determine whether a collision or delivery failure is likely due to self-interference, and report information regarding the determination to the central device. In other embodiments, a particular node may provide any information that may be used to identify self-interference to the central device (e.g., the central device determines whether a self-interference condition is present). For example, a particular node may report information regarding any collisions, network failures, traffic rates, etc., associated with a data link that may be used to determine whether self-interference is present. In further embodiments, a central device may use such information to verify whether the node has correctly detected the presence of self-interference.

Notably, recent techniques and newer IEEE 802.15.4g radios are capable of providing some indication of when collisions may have occurred. In one case, such radios indicate whether there was a step increase in the signal strength after sync-word detection, indicating that a signal being received may have been interrupted by another signal. In another case, packets may be modified to include both a header and footer to help indicate when a collision has occurred (e.g., using the capture effect or Zig-Zag techniques). In yet another example, methods such as CRC errors may also be used to infer that a collision was likely at the receiver. Any or all of this information may be reported to a central device that is computing source routes (e.g., a DODAG Root when using RPL), a device that is attempting to optimize overall network performance (e.g., an NMS), or any other device configured to minimize self-interference in the network.

In various embodiments, the central device may analyze the received physical layer and self-interference information to identify the presence of self-interference in the network. In contrast to having individual nodes determine their own transmission strategies, a central device may have greater visibility into the network. For example, with a routing protocol like RPL, the root device also has visibility into the routing topology. Thus, the central device has good visibility into the traffic that flows through the mesh, which allows the central device to determine where points of self-interference may be occurring by observing areas where traffic rates, collisions, etc. are high.

If the central device determines that self-interference in the network is present and/or is above an acceptable level, the central device may determine whether it is possible to reduce the self-interference by adjusting the transmission strategy used by one or more of the nodes along a communication path. In particular, by collecting the self-interference information from the node(s), the central device can determine where collisions are occurring and whether those collisions are possibly due to self-interference. Additionally, by collecting the physical layer/link information from the node(s), the central device can determine if self-interference is a possible cause (e.g., by comparing the channel-mask, channel-hopping schedule, and/or PHYs being used) and determine whether any configuration changes can be made to mitigate the self-interference.

The central device may make any number of adjustments to reduce or eliminate self-interference in the network. In one embodiment, areas that experience higher traffic loads may benefit from the central device altering or otherwise adjusting which PHYs to use when forwarding packets along a path. This allows a device to optimize only portions of the network rather than trying to optimize the entire network in whole. For example, in areas with low traffic, self-interference is generally not of concern. In another embodiment, the central device may update the channel-mask on one or more nodes, to minimize or eliminate the overlap in the channels being used, thereby minimizing self-interference. In a further embodiment, the central device may alter the channel-hopping schedule used by the node(s), to minimize any overlap in the channel-hopping schedules between devices. In yet another embodiment, the central device may determine that a particular node should change its preferred default route to reduce self-interference, since communicating with a different neighbor involves using a different channel-hopping schedule.

In cases in which RF and PLC links provide different data rates, the central device may also form communication paths that shift the self-interference burden to links that have higher capacity. For example, if a path requires using a PLC link operating at a low data rate, it can utilize RF with higher data rates for the other links within spatial proximity to minimize the amount of self-interference on the PLC link. In another embodiment, if a critical link has too low of a data rate, the central device may instruct the node(s) along the path to utilize both RF and PLC simultaneously. Doing so may increase channel utilization for a particular link but may also reduce overall congestion along a path.

Figure 8B:
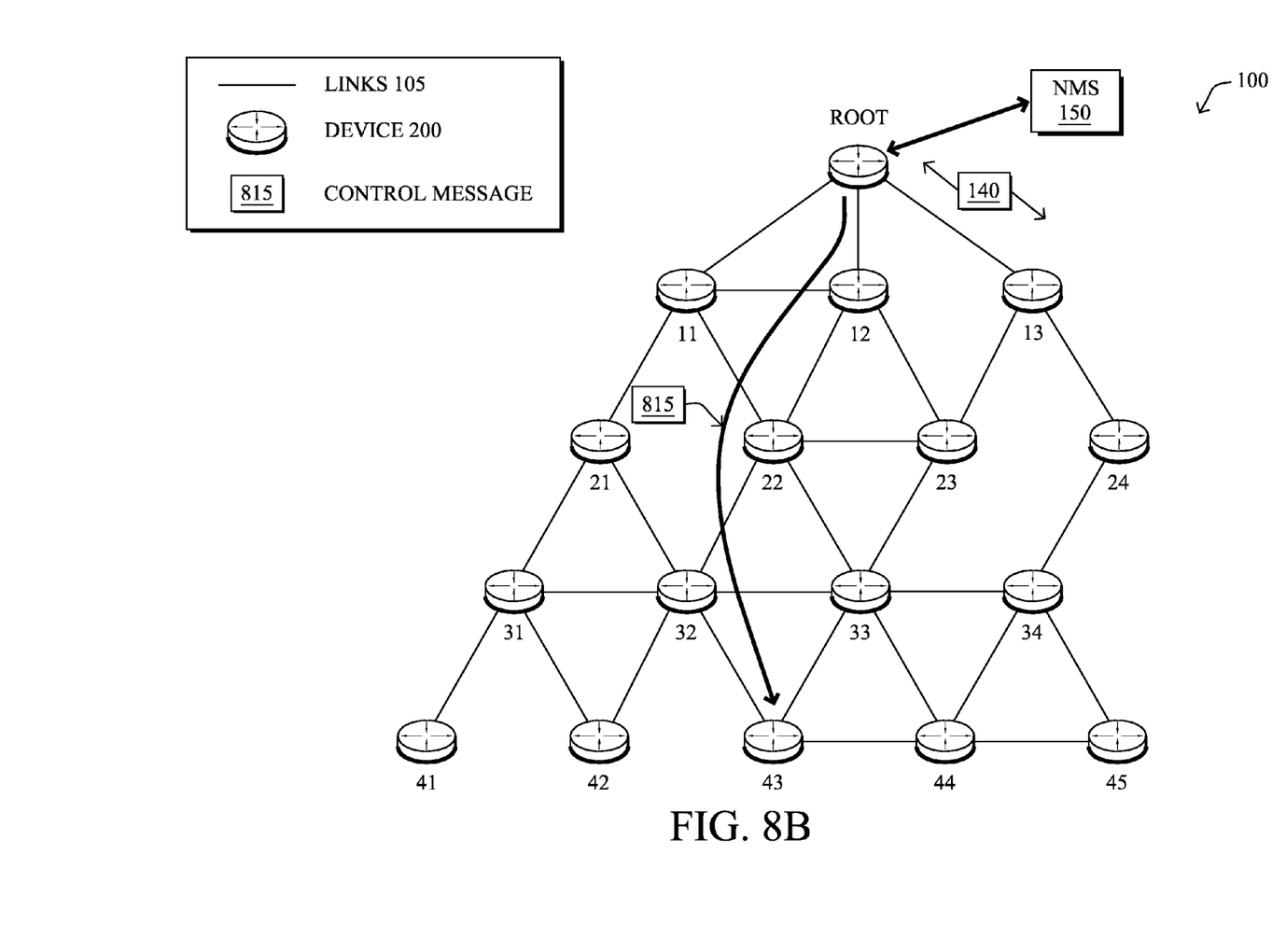

If the central device determines that one or more nodes should use a different transmission strategy, the central device may send a control message to the set of device(s) that should change their link properties and/or route selection. For example, as shown in FIG. 8B, the rood may send a control message 815 to node 43 to change its link usage or routing strategy (e.g., to use a different neighbor node for packet transmittal). Generally speaking, the control message includes information about what parameters are to be changed and their new values. In one embodiment, the root device may instruct node 43 to use a different physical layer for communication (e.g., to change between using a wireless or wired connection, or vice-versa). In another embodiment, the root device may instruct a particular node to alter the operation of its connection(s) in use. For example, the central device may instruct a node that communicates wirelessly to use a new channel-mask or a new channel-hopping schedule. In yet another embodiment, the central device may instruct one or more nodes to update their routes. For example, if the central device determines that self-interference can be eliminated by having a node use a different next-hop destination, the central device may send a control message to install a route at the node.

One example of self-interference being eliminated is shown in FIGS. 9A-9E, according to some embodiments. Continuing the example of FIG. 4, assume that node 12 communicates with node 22 on the same channel that node 32 uses to communicate with node 43. Because the nodes are in close proximity, node 22 may fall within the transmission range 402 of node 32, potentially blocking the transmission from node 12 to node 22 if node 32 is transmitting at the same time. Due to the self-interference, forwarding packets along the path results in an end-to-end throughput reduction to at least one-third that of the maximum link throughput. In other words, only one third of the nodes shown may transmit data packets simultaneously without exhibiting self-interference.

Figure 9A:
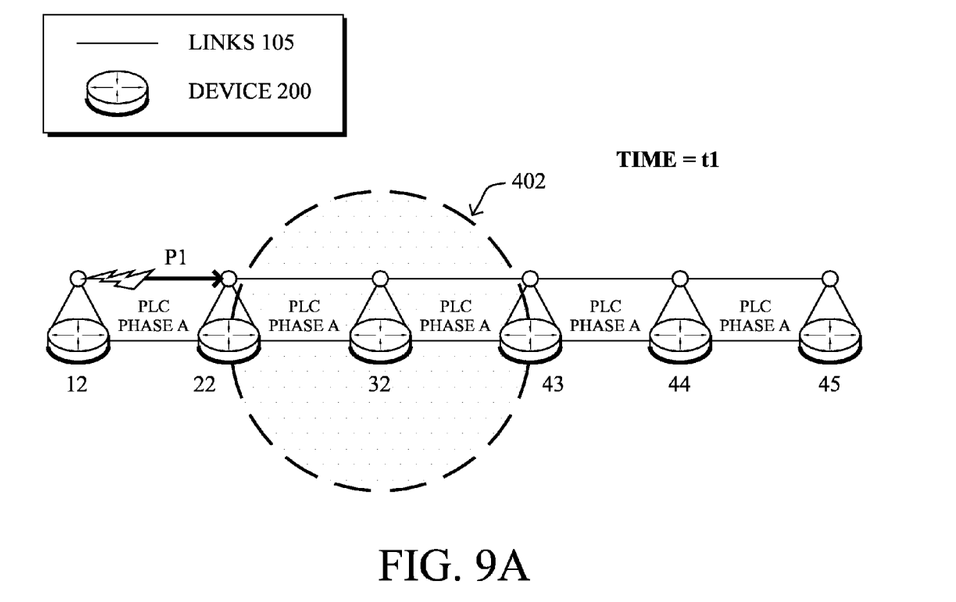
FIGS. 9A-9E illustrate an example of self-interference being eliminated.
Figure 9B:
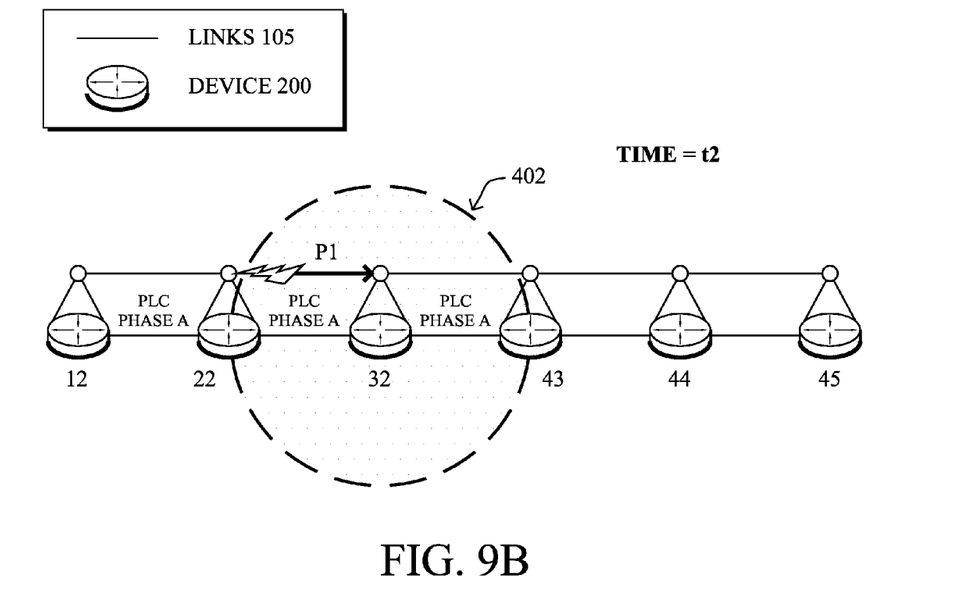

Assume that the nodes shown in FIGS. 9A-9E are configured to communicate both wirelessly and via wired PLC links with their neighboring devices. To prevent the self-interference condition illustrated in FIG. 4, the central device may instruct node 32 communicate with node 43 via a PLC link (e.g., using electrical phase A) instead of wirelessly. In doing so, the end-to-end throughput along the path is reduced to only one half, as opposed to one third when the self-interference condition is present. For example, as shown in FIG. 9A, node 12 transmits a first packet (packet P1) wirelessly to node 22 at a time t1. Since node 32 has been instructed to use its PLC link to communicate with node 43 instead of a wireless link, node 32 no longer presents a potential source of self-interference. At time t2, node 22 then forwards packet P1 wirelessly to node 32, as illustrated in FIG. 9B. Again, since node 32 is no longer communicating wirelessly with node 32, this transmission may be without interference.

Figure 9C:
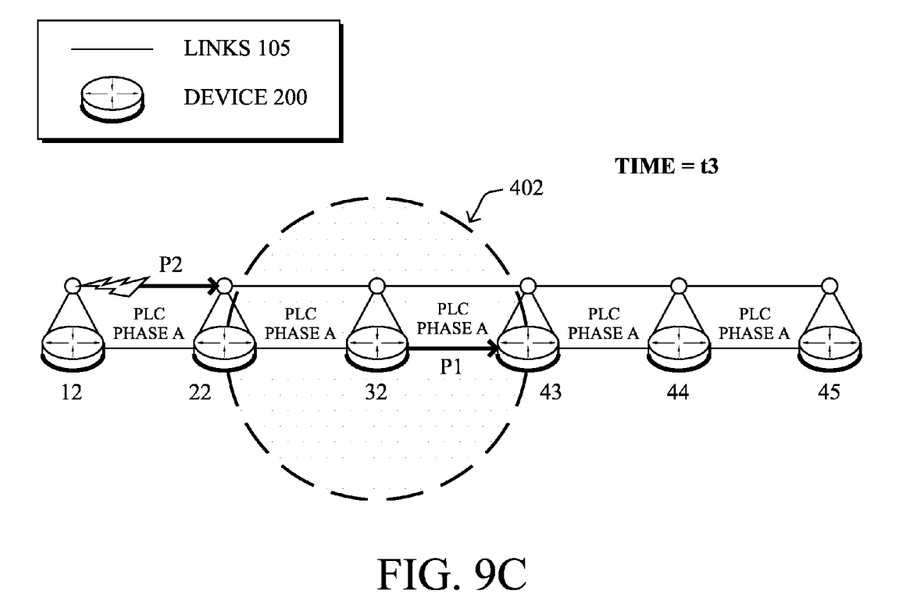
Figure 9D:
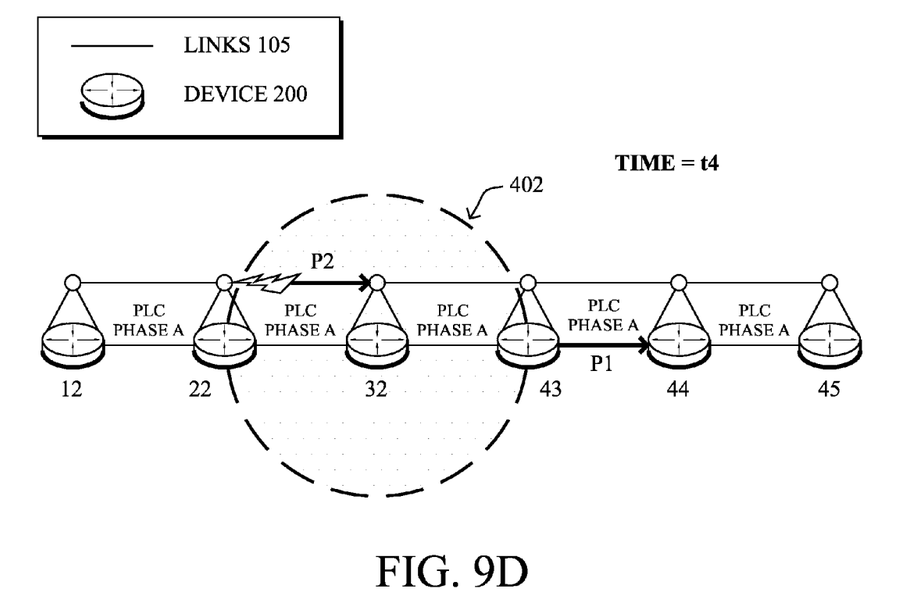
Figure 9E:
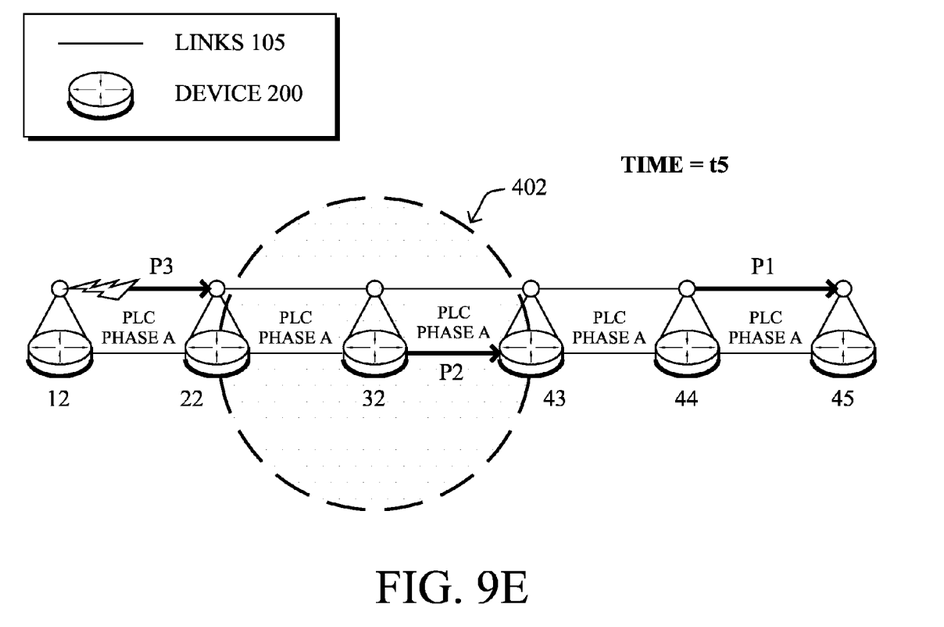

The sending of subsequent packets is depicted in FIGS. 9C-9E. As shown in FIG. 9C, node 12 sends a second packet (P2) to node 22 at time t3. During this time, node 32 also transmits the first packet (P1) to node 43 using a wired PLC link. Since node 32 is not transmitting packet P1 wirelessly, the transmission of packet P1 does not interfere with the transmission of packet P2. In FIG. 9D, packet P1 is sent from node 43 to node 44 using a PLC connection at time t4. At this time, node 22 also sends packet P2 to node 32 via a wireless connection. In FIG. 9E, a third packet (P3) is introduced to the path at a time t5 when node 12 sends packet P3 to node 22. At this time, node 32 forwards packet P2 to node 43 via its PLC connection and node 44 sends packet P1 to node 45 wirelessly. As would be appreciated, the overall throughput of the path has been increased from one third (as in the case of FIG. 4) to one half, by adjusting the physical layers used by the nodes to eliminate self-interference. In addition, the multi-PHY system offers even greater opportunities when losses are taken into account. For example, the transmission of packet P2 to node 32 can still occur wirelessly even while node 32 is transmitting packet P1 to node 43 via a PLC connection. In other words, if node 32 experiences a delay in transmitting packet P1, node 22 does not need to worry about the delay unless buffering becomes an issue.

Figure 10:
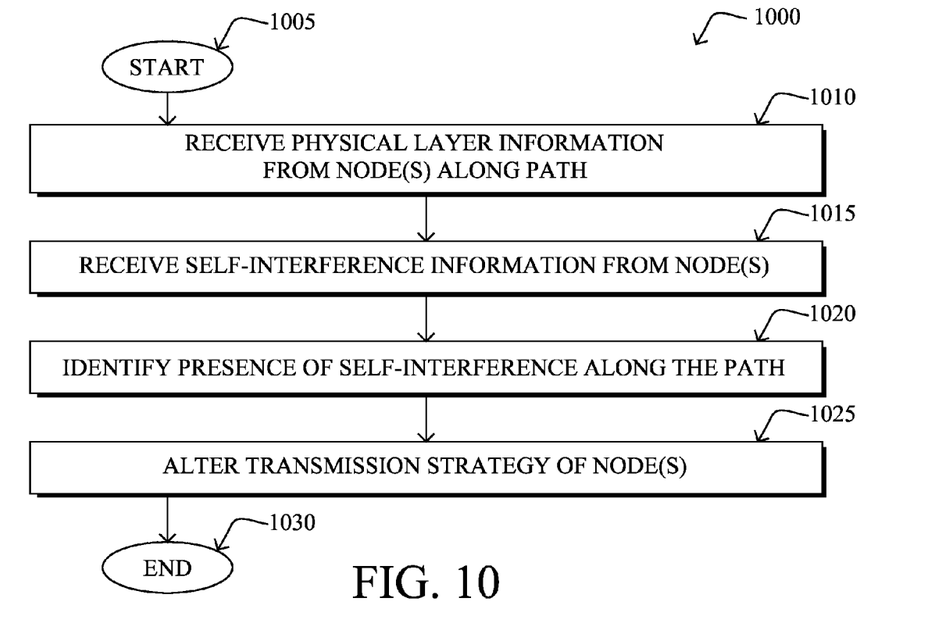
FIG. 10 illustrates an example simplified procedure for altering a transmission strategy of a network node.

FIG. 10 illustrates an example simplified procedure for altering a transmission strategy of a network node in a shared-media communication network in accordance with one or more embodiments described herein. The procedure 1000 may start at step 1005, and continues to step 1010, where, as described in greater detail above, physical layer information is received from one or more nodes along a communication path in the network. In general, the physical layer information may include data regarding which physical layers are available to a node for communication with a neighbor, which of these layers are currently in use, and/or information regarding the layers in use. For example, a network node may indicate that it is currently using an RF connection to communicate with its neighbor along the path. In another example, the node may indicate that it is able to communicate with its neighbor using either or both of an RF connection and a PLC connection. In a further example, the layer information may include details regarding a communication link, such as a channel-mask, channel-hopping schedule, electrical phases used (e.g., in the case of a PLC link), or other such information.

At step 1015, self-interference information is also received from the one or more network nodes, as described in greater detail above. In general, the information may include any data that may indicate the presence of self-interference. For example, the information may include data such as traffic rates, collision information, detected failures, or other such information.

At step 1020, the presence of self-interference along a communication path is identified, as detailed above. Using the received self-interference information, a central network device may determine whether or not self-interference is present in the network. In some cases, the self-interference information may include an indication that a node has determined that self-interference condition may exist. In such a case, the central device may validate the node's assessment using the received information. In other cases, the central device may itself use the received self-interference information to determine whether self-interference exists.

At step 1025, the transmission strategy of one or more nodes along the communication path is altered, as described in greater detail above. Generally speaking, the central network device may use the received physical layer and self-interference information to determine whether the one or more nodes along a communication path should alter how they communicate data. In particular, the central device may first determine whether any alternate transmission strategies are available to the nodes and links affected by the self-interference. For example, the central device may determine whether alternate physical layers can be used between pairs of nodes along the path, whether different link characteristics are available, or whether rerouting the path is possible. The central device may then analyze the different scenarios to select a transmission strategy that minimizes self-interference along the path. For example, the central device may disregard a strategy that alters the physical layer used along one link, if the central device determines that doing so will create a self-interference condition elsewhere along the path. In another example, the central device may elect to modify the topology of the path itself, if no modifications to the existing links in the path are determined to reduce or eliminate the presence of self-interference.

Any number of instructions may be issued to alter the transmission strategy of a node along the path. In some embodiments, a particular node may be instructed to alter which physical layers it uses to communicate with a neighboring device and/or the characteristics of a given connection (e.g., channel-mask, electrical phase, hopping schedule, etc.). In further embodiments, the central device may instruct one or more of the nodes along the path to alter the topology of the path (e.g., by instructing a node to communicate with a different neighbor instead). In some cases, the node(s) instructed to alter their transmission strategies may be selected by the central device based on their traffic characteristics. For example, the central device may opt to concentrate the altering of data links to areas of the network that experience high amounts of traffic. Procedure 1000 then ends at step 1030.

It should be noted that while certain steps within procedures 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the minimization of self-interference when forwarding packets within a LLN. Minimizing self-interference along a communication path increases robustness, reduces end-to-end latency, reduces channel utilization, and improves overall network performance. In other words, minimizing self-interference not only reduces the chance for collisions caused by shared-media access but also improves overall resource utilization efficiency since this invention allows simultaneous use of non-conflicting resources.

While there have been shown and described illustrative embodiments that provide for the dynamic adjustment of transmission strategies in a mesh network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., other wireless or wired communication techniques). In addition, while certain protocols are shown, such as RPL, other suitable protocols may be used, accordingly. Also, while the techniques generally describe initiation and determinations by a supervisory device such as a PCE, NMS, root device, etc., other network device/nodes may be configured to perform the techniques described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a network device, physical layer information from one or more nodes along a communication path in a network, wherein the physical layer information indicates a first set of nodes of the one or more nodes communicate over an radio frequency (RF) connection with respective neighboring nodes, a second set of nodes of the one or more nodes communicate over a power line communication (PLC) connection with respective neighboring nodes;
   receiving, at the network device, self-interference information from the one or more network nodes regarding at least the communication path traversing a first pair of the second set of nodes, wherein the self-interference information indicates that the first pair of nodes using a first electrical phase for PLC over the communication path interfere with a second pair of nodes, the second pair being traversed by another communication path and using a second electrical phase different than the first phase, due to cross-talk between the first and second electrical phases;
   identifying, by the network device, one or more packets to be sent along the communication path; and
   altering, by the network device, a transmission strategy, the altering comprising instructing the first pair of the one or more nodes to communicate the one or more packets over an RF connection instead of a PLC connection based on the identified self-interference and the received physical layer information.

2. The method as in claim 1, wherein altering the transmission strategy further comprises:
   instructing a particular node to use a wireless connection to communicate with another node along the communication path instead of a wired connection.

3. The method as in claim 2, wherein the wired connection is a PLC link.

4. The method as in claim 2, wherein altering the transmission strategy further comprises:
   instructing the particular node to use a wired connection to communicate with another node along the communication path instead of a wireless connection.

5. The method as in claim 1, wherein altering the transmission strategy further comprises:
   instructing a particular node to use both a wireless connection and a wired connection to communicate with another node along the communication path.

6. The method as in claim 1, wherein altering the transmission strategy of the one or more nodes further comprises:
   altering a channel-mask used by the one or more nodes.

7. The method as in claim 1, wherein altering the transmission strategy of the one or more nodes further comprises:
   altering a channel hopping schedule used by a particular node along the communication path.

8. The method as in claim 1, wherein altering the transmission strategy of the one or more nodes further comprises:
   instructing a particular node along the communication path to use a different communication path.

9. An apparatus, comprising:
   one or more network interfaces to communicate with a low power and lossy network (LLN);
   a processor coupled to the network interfaces and adapted to execute one or more processes; and
   a memory configured to store a process executable by the processor, the process when executed operable to:
   receive physical layer information from one or more nodes along a communication path in a network, wherein the physical layer information indicates a first set of nodes of the one or more nodes communicate over an radio frequency (RF) connection with respective neighboring's nodes, a second set of nodes of the one or more nodes communicate over a power line communication (PLC) connection with respective neighboring nodes;
   receive self-interference information from the one or more network nodes regarding at least the communication path traversing a first pair of the second set of nodes, wherein the self-interference information indicates that the first pair of nodes using a first electrical phase for PLC over the communication path interfere with a second pair of nodes, the second pair being traversed by another communication path and using a second electrical phase different than the first phase, due to cross-talk between the first and second electrical phases;
   identify, by the network device, one or more packets to be sent along the communication path; and
   alter a transmission strategy, the altering comprising instructing the first pair of the one or more nodes to communicate the one or more packets over an RF connection instead of a PLC connection based on the identified self-interference and the received physical layer information.

10. The apparatus as in claim 9, wherein the transmission strategy further comprises:
    instructing a particular node to use a wireless connection to communicate with another node along the communication path instead of a wired connection.

11. The apparatus as in claim 10, wherein the wired connection is a PLC link.

12. The apparatus as in claim 10, wherein altering the transmission strategy further comprises:
    instructing the particular node to use a wired connection to communicate with another node along the communication path instead of a wireless connection.

13. The method as in claim 9, wherein altering the transmission strategy further comprises:
    instructing a particular node to use both a wireless connection and a wired connection to communicate with another node along the communication path.

14. The apparatus as in claim 9, wherein the transmission strategy of the one or more nodes further comprises:
    altering a channel-mask used by the one or more nodes.

15. The apparatus as in claim 9, wherein the transmission strategy of the one or more nodes further comprises:
    altering a channel hopping schedule used by a particular node along the communication path.

16. The apparatus as in claim 9, wherein the transmission strategy of the one or more nodes further comprises:
    instructing a particular node along the communication path to use a different communication path.

17. A tangible, non-transitory, computer-readable media having software encoded thereon, the software when executed by a processor operable to:
    receive physical layer information from one or more nodes along a communication path in a network, wherein the physical layer information indicates a first set of nodes of the one or more nodes communicate over an radio frequency (RF) connection with respective neighboring nodes, a second set of nodes of the one or more nodes communicate over a power line communication (PLC) connection with respective neighboring nodes;
    receive self-interference information from the one or more network nodes regarding at least the communication path traversing a first pair of the second set of nodes, wherein the self-interference information indicates that the first pair of nodes using a first electrical phase for PLC over the communication path interfere with a second pair of nodes, the second pair being traversed by another communication path and using a second electrical phase different than the first phase, due to cross-talk between the first and second electrical phases;
    identify, by the network device, one or more packets to be sent along the communication path; and
    alter a transmission strategy, the altering comprising instructing the first pair of the one or more nodes to communicate the one or more packets over an RF connection instead of a PLC connection based on the identified self-interference and the received physical layer information.

\* \* \* \* \*